METHOD FOR STABILIZING SEMICONDUCTOR MATERIAL

Filed Nov. 29, 1951

Inventor:
William C. Dunlap, Jr.
by Paul A. Frank
His Attorney.

Patented May 19, 1953 2,639,246

UNITED STATES PATENT OFFICE 2,639,246

METHOD FOR STABILIZING SEMICONDUCTOR MATERIAL

William C. Dunlap, Jr., Schenectady, N. Y., assignor to General Electric Company, a corporation of New York Application November 29, 1951, Serial No. 258,826

7 Claims. (Cl. 148—13)

Figure 2:
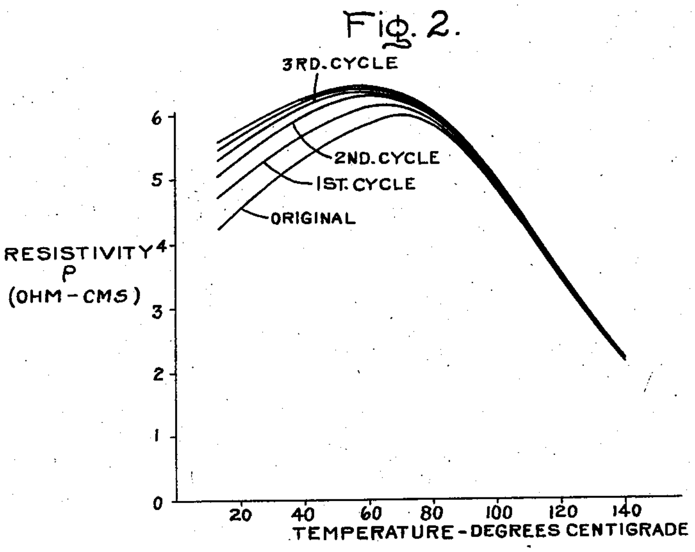

My invention relates to methods for making semiconductor bodies, such as comprising primarily germanium, for use as the effective element in semiconductor devices.

Semiconductor bodies comprising substantially pure germanium, or germanium alloyed with small amounts of "acceptor" or "donor" impurities, hereinafter referred to as "primarily germanium" bodies, are now extensively employed in contact rectifiers, photocells, thermoelectric devices, and in amplifiers known as "transistors." The resistivity of the primarily germanium bodies employed in these devices is ordinarily in the range of 1 to 20 ohm centimeters at room temperature, and their resistivity varies considerably as a function of temperature.

Various methods are currently employed to produce these semiconductor bodies, the choice of methods depending upon the physical and chemical properties desired to be attained. In one method germanium dioxide is reduced in an oxygen-free atmosphere to form a germanium ingot from which the effective members in the form of small germanium wafers are cut or otherwise extracted. Traces of "donor" or "acceptor" impurities may be introduced into the melt to obtain N-type or P-type conduction characteristics, as desired. If highly purified germanium is desired, the ingot may be directionally cooled to remove impurities from the earliest-cooled portion thereof. The solidified ingots or the extracted wafers are often annealed at temperatures in the neighborhood of 500 degrees centigrade to insure uniformity of conduction characteristics therein. Conventional crystal forming techniques may also be employed to produce the semiconductor ingots from suitable melts.

Regardless of the techniques by which these semiconductor bodies have heretofore been made, they are usually subject to minor variations or "drifts" in their resistivity characteristic over short or long periods of time; particularly as a result of variations in temperature. I have found, for example, that an initial cyclic swing in temperature from zero to 200 degrees centigrade and back often leads to an irreversible increase in resistivity as great as 10 to 15%. The most unstable region of the temperature vs. resistivity characteristic of such germanium bodies is the region between 0° and 100° centigrade where the conduction properties of the body are primarily dependent upon the type and amount of impurities in the germanium; and it is, therefore, believed that the instability is due to migration or other action of the impurity atoms. This impurity dependent region of the temperature vs. resistivity characteristic lies within the normal operating temperatures of semiconductor devices.

Accordingly, one object of the invention is to provide a method for stabilizing the conduction characteristics in semiconductor bodies, and particularly to provide a method for stabilizing the temperature vs. resistivity characteristic of semiconductor bodies.

A further object is to provide a method for stabilizing the resistivity of a semiconductor body comprising primarily germanium at a predetermined temperature or temperature range at which the body is destined to operate.

In accordance with the invention, the semiconductor body is subjected to a cyclical variation in temperature extending to at least 50 degrees centigrade above the normal destined operating temperature of the body; it being understood that the destined operating temperatures in such semiconductor bodies is usually between zero and 100° centigrade. If the semiconductor body is destined to operate over a range of temperatures, the cyclic temperature variation should be over a range at least as great as the destined operating temperature range. Preferably, the cyclic temperature variation is between extremes much greater than the 50 degree minimum set forth above, and the temperature excursion is both above and at least 20 degrees below the destined operating temperature although considerable improvement results when temperature cycling is in a higher temperature direction only. A temperature cycling process in accord with the invention between zero and 200 degrees, for example, has been found effective in stabilizing the resistance vs. temperature characteristics of germanium over this entire zero to 200 degree range.

The number of cyclic variations in temperature to which the body should be subjected depends upon the initial physical condition of the specimen to be stabilized, as well as the degree of stability required. In most semiconductor bodies prepared by conventional methods, 10 to 20 temperature cycles suffice to reduce the subsequent change in the resistance vs. temperature characteristic substantially to zero.

Figure 1:
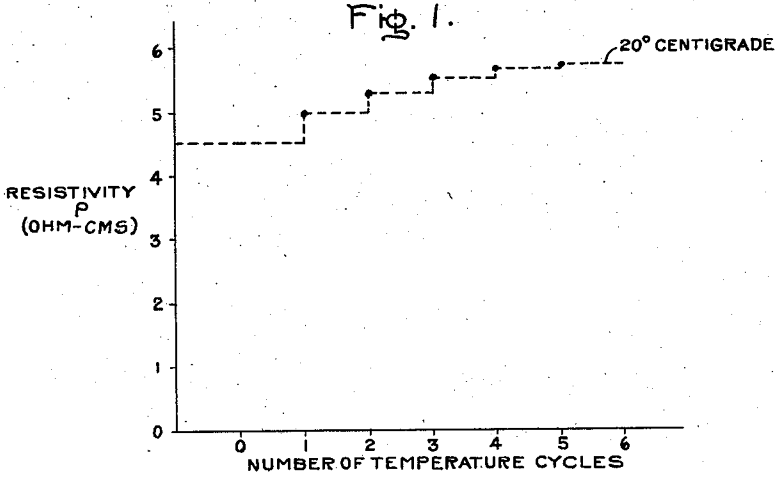

For a better understanding of the invention, reference is made to the following detailed description taken in connection with the accompanying drawing in which Fig. 1 is a typical plot of resistivity vs. temperature cycles for primarily germanium bodies at a predetermined operating temperature, and Fig. 2 is a group of typical resistance vs. temperature curves for primarily germanium bodies, which curves illustrate a typical change in resistivity vs. temperature characteristic with successive temperature cycles.

One convenient way to practice the method of the invention is to transfer the semiconductor body between immersions in two baths, one maintained at zero degrees centrigrade, and the other maintained at 200 degrees centigrade. An ice bath may conveniently comprise the zero degree bath while a heated silicone oil bath may be employed for the 200 degree bath. The substance used for the bath should of course be one which does not react chemically with the germanium body. The semiconductor body may be either in the form of an ingot or in the form of a small wafer or pellet cut from the ingot such as is normally employed in semiconductor devices. The rapid quenching which results from immediate transferal between the two baths is not ordinarily sufficient to produce thermal cracking with the temperatures involved. A slower rate of heating and cooling by any of the conventional radiation, convection or induction heating methods may alternately be employed if any tendency toward thermal cracking is observed. The semiconductor body should, of course, be allowed to cool to zero degrees while in the ice bath and to heat to 200 degrees when in the oil bath. The time at which the semiconductor body remains in either the zero degree or 200 degree temperature state is not critical. Similarly, the rate of heating or cooling is also not critical although a thermal rate of change of at least 10 degrees per minute is to be preferred. As mentioned above, the semiconductor body is preferably subjected to at least 10 complete temperature cycles in order that the change in the resistivity vs. temperature characteristic will be reduced substantially to zero.

Referring to Fig. 1, there is shown a typical resistivity vs. temperature cycle graph for a semiconductor body having an initial resistivity of 4.5 ohm centimeters at 20 degrees centigrade. The graph is typical of those plotted for specimens cut from an ingot prepared by a reduction of substantially pure germanium dioxide in an oxygen free atmosphere and subsequently annealed at 500 degrees centigrade for approximately 15 hours. As can be seen from the curve of Fig. 1, the resistivity of the germanium specimen at 20 degrees centigrade increases considerably after the first temperature cycle with slowly decreasing increments of resistivity increase during succeeding temperature cycles, until the resistivity at this temperature remained substantially constant after the fifth temperature cycle.

The change in the entire resistivity vs. temperature characteristic usually accompanying the temperature cycling process of the invention is illustrated by the typical curves of Fig. 2. As can be seen from the original curve of a specimen having an initial resistivity of 4.5 ohm-centimeters at 20 degrees centigrade, the resistivity of the germanium body gradually increases until a temperature of 75 degrees centigrade, whereupon it begins to drop rapidly with increases in temperature. As indicated by the 1st cycle curve, primarily the initial impurity-dependent portion of the resistivity vs. temperature characteristic between 0° and 75° shifts upward after the first temperature cycle, although a slight upward shift may be observed above this maximum resistivity temperature in the "intrinsic conduction" region of the temperature vs. resistivity characteristic. Thereafter, the characteristic curve continues to shift upward with decreasing increments of increase with succeeding temperature cycles until eventually no further change in the characteristic curve is apparent.

Although the curves of Figs. 1 and 2 are illustrated with reference to germanium bodies having an original resistivity at 20 degrees centigrade of about 4.5 ohm centimeters, the same phenomenon is observed with germanium bodies having an original resistivity varying anywhere between one and 20 ohm centimeters at 20 degrees C.

From the foregoing it will be seen that the present invention provides a new method for stabilizing the resistivity of semiconductor bodies comprising primarily germanium at a predetermined operating temperature, or for stabilizing the entire resistivity vs. temperature characteristic of such germanium bodies over the entire useful operating range. Although I have described particular methods in accord with the invention, it is to be understood that I intend to cover, by the appended claims, all variations of these methods which fall within the true spirit and scope of the invention.

What I claim as new and desire to secure by Letters Patent of the United States is:

1. The method of stabilizing the temperature versus resistivity characteristic of a germanium body having an original resistivity between 1 and 20 ohm centimeters at room temperature, which method comprises cyclically raising and lowering the temperature of the body for several times over a temperature range including two different temperatures at least 50 degrees apart lying between 0 and 200 degrees centigrade and corresponding to the operating temperature range of the body.

2. The method of stabilizing at an operating temperature lying between 0 and 150° C. the electric resistivity of a body comprising germanium having an original room temperature resistivity between 1 and 20 ohm centimeters, which method comprises cyclically raising and lowering the temperature of the body for several times over a temperature range including the operating temperature and a temperature at least 50 degrees centigrade above the operating temperature.

3. The method of stabilizing the electric resistivity of a germanium body having an original room temperature resistivity between 1 and 20 ohm centimeters at a selected temperature within the range of 0 to 150 degrees C., which method comprises cyclically raising and lowering the temperature of the body for several times between temperature extremes at least 50 degrees centigrade above and at least 20 degrees centigrade below the selected temperature with a thermal rate of change equal to at least 10 degrees per minute.

4. The method of stabilizing the temperature versus resistivity characteristic of a germanium body having traces of impurities and having an original room temperature resistivity between 1 and 20 ohm centimeters, which method comprises cyclically raising and lowering the temperature of the body for several times between temperature extremes in the neighborhood of 0 and 200 degrees centigrade.

5. The method of claim 4 in which the temperature of the body is cyclically raised and lowered between the temperature extremes with a thermal rate of change greater than 10 degrees per minute and less than the thermal cracking rate of the body.

6. The method of claim 4 in which the body is subjected to at least 10 temperature cycles.

7. The method of stabilizing the temperature versus resistivity characteristic of a germanium body having an original resistivity between 1 and 20 ohm centimeters at room temperature, which method comprises cyclically raising and lowering the temperature of the body by transferring the body at least 10 times between immersions in a bath maintained at zero degrees centigrade and a bath maintained at 200 degrees centigrade.

WILLIAM C. DUNLAP, Jr.

References Cited in the file of this patent

NDRC Report Div. No. 14–SR 1408–555, pp. 17–23, published by Office of Scientific Research and Development.